United States Patent Office 3,359,970
Patented Dec. 26, 1967

3,359,970
APPARATUS FOR APPLYING A LAYER OF THERMOPLASTIC MATERIAL
Soren Kristoffer Pedersen, Vangen 24, Tved, near Kolding, Denmark, and Jorden Peder Kjaer Jorgensen, Norregade 50, Vejen, Denmark
Filed Apr. 7, 1966, Ser. No. 540,885
Claims priority, application Denmark, Apr. 12, 1965, 1,842/65; Aug. 10, 1965, 4,084/65
7 Claims. (Cl. 126—343.5)

ABSTRACT OF THE DISCLOSURE

An apparatus for applying a layer of thermoplastic material such as tar or asphalt, said apparatus including a heated container for the material and a pump for conveying the material from the heated container to the place of its application. In accordance with the invention, the discharge conduit which receives material from the pump, passes through the container close to the heating member or members for the container, thereby heating the material so that, if desired, a long discharge conduit may be employed without the danger of having the material congeal therein. The apparatus may be provided with a shunt conduit for recirculation of the material. In a preferred embodiment the motor for driving the pump is reversible, there is provided a thermostatic means for controlling the activation of the heating means for the container, and there is also provided electric control means for activating the reverse movement of the driving motor during a predetermined period.

---

Figure 1:
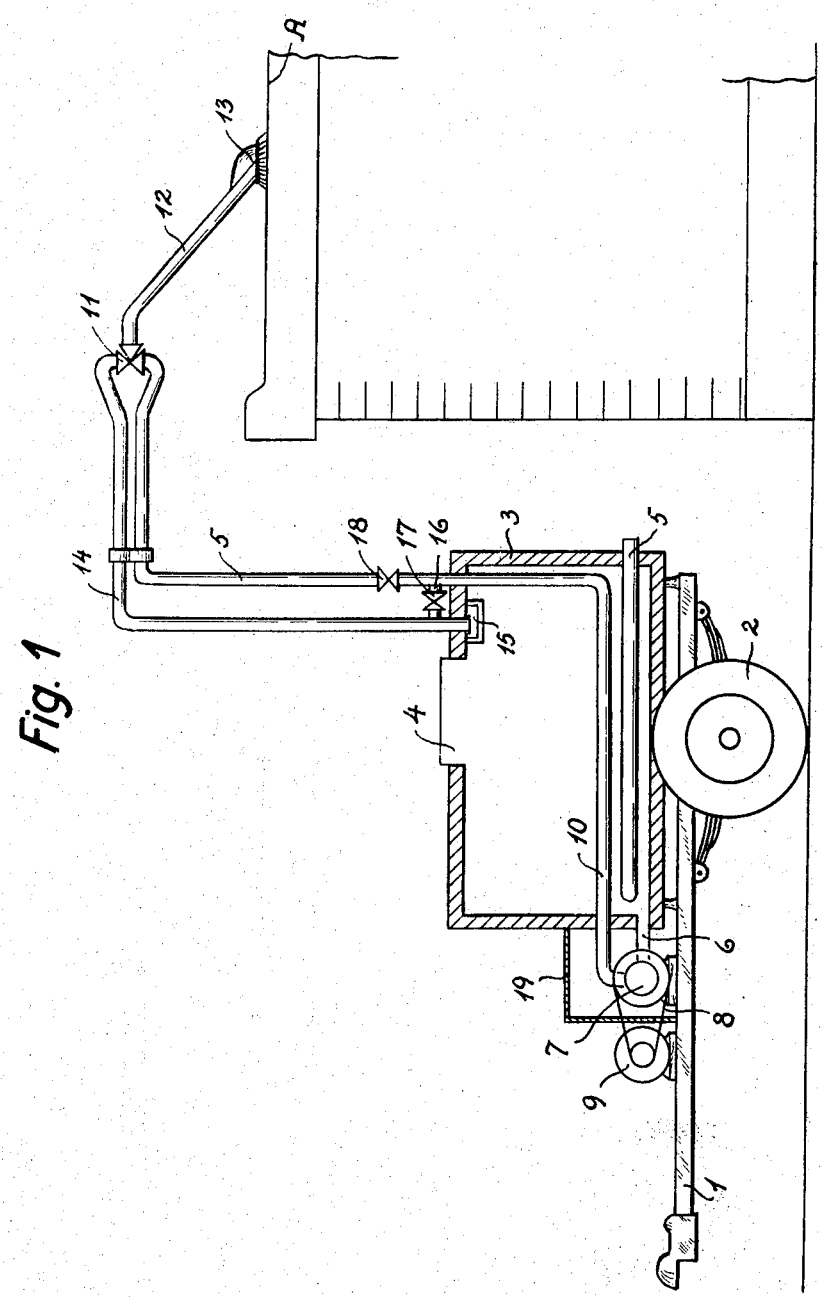

It has hitherto been difficult to avoid clogging of the apparatus because the material is liable to harden when conveyed through a long discharge conduit, the risk of clogging arising when the discharge of material is stopped and the conduit is to be emptied by reversing the pump. During the stopping and the emptying of the conduit the material will cool down to such a degree and become so viscous that the operation of the apparatus may be interrupted with the result that the apparatus is unable immediately to supply new material when desired. It has therefore not been possible to use known apparatus of the kind in question, which is used for making road surfaces and is provided with short discharge conduits, for the application of layers on roofs, where the material often has to be pumped through a discharge conduit having a length of more than 20 metres.

According to the invention the objective is attained by the fact that the discharge conduit of the conveyor pump, which can be heated, passes through the heating container close to the heating member or the heating members of the container.

When the discharge of material from the discharge conduit is stopped and the pump is reversed in order to empty the conduit, the reversing material will first pass the heated mass of material in the heating container and receive heat from the said mass in order to avoid the clogging of the pump by the viscous material and thus more or less ineffective. If the said pre-heating does not suffice to give the returning materials a sufficiently low viscosity, the said materials can according to the present invention be further heated in the pump, clogging of the pump thus being avoided. This means that one need not be afraid of using a long discharge conduit. Experiments have shown that it is possible to use a discharge conduit of 26 metres or more without risk of interruption of the apparatus, which means that the apparatus according to the invention can be readily used for coating of roofs without having to be hoisted onto the roof.

According to the invention the heating of the conveyor pump can take place in different ways. The pump can be connected with a heating device independent of the heating device of the container; thus an individual control of the heating of the pump is possible. The conveyor pump can also be surrounded by a heating jacket connected with the heating members arranged in the container, the waste heat of the said members being used for the heating of the pump.

According to the invention an expedient embodiment of the apparatus is provided with a heating device for the container wherein such heating means consists of a system of heating tubes which are arranged across the bottom of the container and are connected to a manifold, the discharge conduit passing through the container and longitudinally of and close to at least one of the said tubes. Thus, a uniform heating of the contents of the container is obtained together with an effective heating of the discharge conduit and thus also a good re-heating of the material returning through the discharge conduit.

For cleaning purposes the conveyor pump with the heating jacket and the heating tubes can be attached to a removable end wall of the heating container.

Apparatus of the kind in question is known to be provided with a shunt conduit connected with the discharge conduit for recirculation of the material in order to attain or to maintain good heating of the said material. According to the invention, the shunt conduit ends freely in the upper part of the heating container, so that returning material is distributed over the surface of the mass in the container and becomes well mixed with the mass.

The invention will now be further described with reference to the drawing of which FIG. 1 is a schematic view of an embodiment of the apparatus according to the invention, FIG. 2 on a larger scale a schematic plan view of a part of another embodiment of the apparatus, a number of parts of the apparatus having been removed and others being sectional, and FIG. 3 a flow diagram of the electrical circuit of the apparatus according to FIG. 2.

A frame 1 provided with wheels 2 carries a mobile heating container 3 which at the top is provided with a supply opening 4. A heating device 5 is provided at the bottom of the container. A suction conduit 6 of a pump 7 extends from the bottom of the container 3, said pump by means of a belt drive 8 being connected to a reversible electric motor 9. The pump 7 and the motor 9 are also arranged on the frame 1. A discharge conduit 10 extends from the pump into the container 3 and passes therethrough close to the heating device 5, then extending upwards and leaving the container through the top thereof. The conduit 10 there ends in a valve 11 connected to a discharge tube 12 provided with a discharge head which in the embodiment shown on the drawing is formed as a brush 13, and to a return conduit 14 at its lowermost part ending in a distributing channel 15 arranged in the uppermost portion of the container 3. A shunt conduit 16 having a valve 17 is provided between the conduits 10 and 14, and in the conduit 10 a blocking valve 18 is arranged behind the system 16, 17 seen in the direction of advance of the material. Instead of a brush 13 use may be made of e.g. a spray nozzle. The pump 7 is surrounded by a heating jacket 19 for heating the pump.

The apparatus operates as follows: The contents of the container, e.g. asphalt or tar, is heated by means of the heating member 5 to a suitable temperature, e.g. between 150 and 180° C. The pump may work during the heating when the valve 18 is closed, whereas the valve 17 is open, a circulation of the contents of the container thus being possible through the discharge conduit 10, the shunt conduit 16 and the distributing and discharge channel 15 back to the container in order to speed up a uniform heating of the contents which become mixed.

When the contents of the container are to be discharged on the site, e.g. on a roof A of a house, the valve 17 is closed, whereas the valve 18 is opened, so that the contents of the container reaches the members 11, 12 and 13 through the discharge conduit 10. Non-distributed material is returned to the container through the conduit 14, and in practice it is possible to maintain a continuous flow of heated material, the necessary "draining" taking place through the valve 11. The returning material is mixed with the contents of the container, as described above.

When the application of the material onto the roof stops, the motor 9 is reversed, the pump 7 emptying the conduit 10 by suction in order to avoid clogging of cooled and hardened material. The returning material passes the container 3 before attaining the pump and receives heat from the container or from its contents. If this preheating does not suffice to obtain a sufficient low viscosity to avoid clogging of the pump, the pump can be heated by means of the heating jacket 19, thus avoiding ineffectivity at the places where this may occur.

If material is again to be discharged the motor of the pump is reversed and the material will again flow as described in the above.

The member 5 may be heated by means of gas, oil, electricity or the like.

Figure 2:
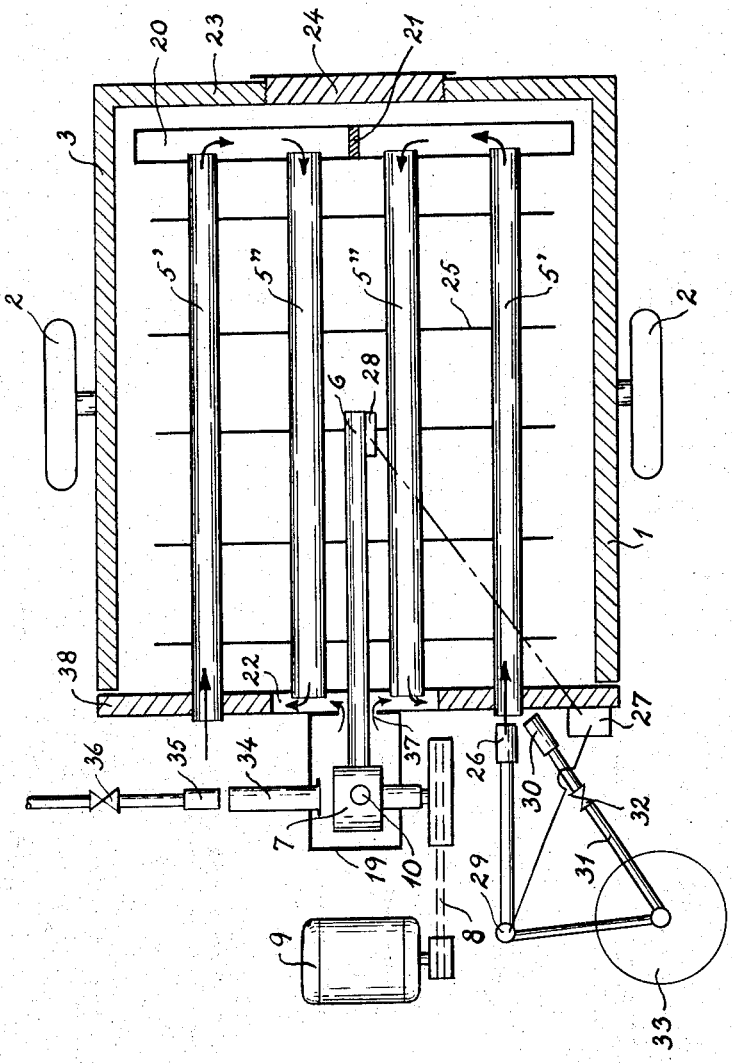

FIG. 2 shows a modified and more detailed embodiment of the apparatus shown in FIG. 1 on an increased scale. Identical parts have identical reference numerals.

The heating members are tubes, the tubes 5′ extending from the left into the container 3 and ending in a manifold 20 which in the middle is provided with a partition 21. Return tubes 5″ extend from the manifold 20 and end in a funnel 22. The manifold 20 is arranged close to the right end wall 23 of the container, said wall being provided with a cover 24 for cleaning purposes, whereas the tubes 5′ and 5″ are provided with heating ribs 23 so as to obtain a uniform heating of the contents of the container. The heating of the said contents is performed by means of burners 26, in the present embodiment gas burners arranged in front of the tubes 5′. The heating is controlled by means of a thermostat 27 having a heat sensitive member 28 arranged on the supply end of the suction conduit 6, said conduit in the embodiment shown extending to the centre of the container. The thermostat 27 controls a magnetic valve 29 for supply of gas to the burner 26. A member 30, e.g. an ignition coil or a pilot light, ignites the burner 26. When use is made of a pilot light, the apparatus is provided with a fuel supply conduit 31 having a valve 32. 33 designates a fuel container which in the present embodiment is a gas cylinder.

The pump 7 is adapted for direct heating, a tube 34 ending in the heating jacket 19 and being provided with a pertaining gas burner 35 having a control valve 36. The combustion air leaves the jacket 19 through apertures 37 and is discharged through the funnel 22.

It is also possible to provide the jacket 18 with heat from the tubes 5′ and 5″.

In the embodiment shown the tubes 5′ and 5″, the conduit 6 and the jacket 19 with the pump 7 are attached to the removable left end wall 38 of the container 3, all the said members thus being able to be removed when the apparatus is to be cleaned.

The circulation and the discharge of the contents of the container takes place in the same way as explained in connection with FIG. 1. The control of the thermostat is effected in such a way that the valve 29 is opened when the thermostat 27 indicates that the temperature in the container is too low, after which the fuel is ignited by means of the member 30. When the desired temperature has been reached the fuel supply through the valve 29 is stopped and the burner 26 goes out.

Figure 3:
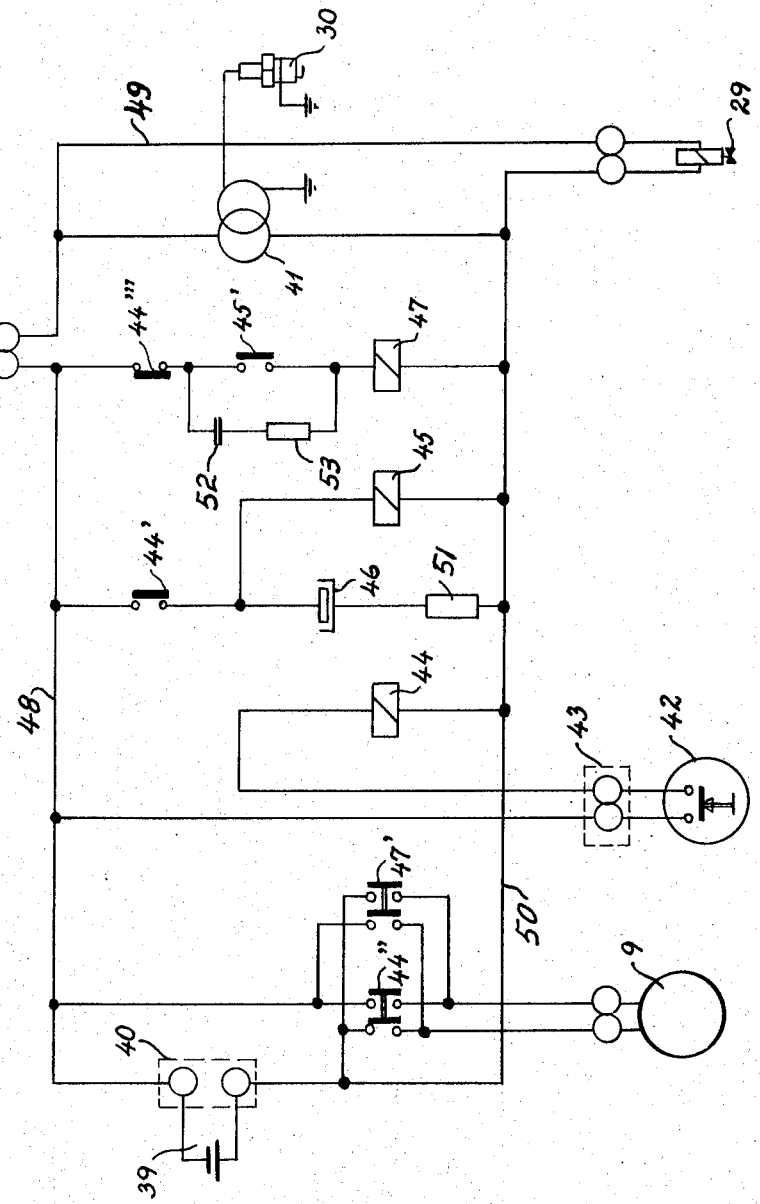

The control of the thermostat is depicted in the circuit diagram shown in FIG. 3 which also gives information about the other electric devices of the apparatus.

A 24 volt accumulator 39 is connected by means of a plug 40 to a panel on the apparatus which is formed as a trailer. From one of the terminals of the plug a conduit 48 connects the said terminal with one of the terminals of the thermostat 27, the other terminal of said thermostat by means of a conduit 49 being connected with one terminal of a plug coupling the valve 29. The other terminal of the plug of the valve 29 is connected to the second terminal of the plug 40 by means of a conduit 50. The said conduit 48 is connected to the conduit 50 by means of a push button 42 and a relay 44, said push button 42 being coupled to the panel by means of a plug 43. The conduit 48 is also connected to the conduit 50 by means of a series connection of a normally open contact 44′ pertaining to the relay 44 and a relay 45, a series connection of a condenser 46 and a resistance 51 being coupled in parallel with the relay 45. The conduits 48 and 50 are also interconnected by means of a series connection of a normally closed contact 44‴ pertaining to the relay 44, a normally open contact 45′ pertaining to the relay 45 and a relay 47, a series connection of a condenser 52 and a resistance 53 being coupled in parallel to the contact 45′. Furthermore, a series connection of a commutator consisting of a normally open contact 47′ pertaining to the relay 47 and a normally open contact 44″ pertaining to the relay 44 and of the pump motor 9 connected by means of a plug is coupled between the conduits 48 and 50. A grounded sparking transformer 41 connected to a grounded ignition member 30 is coupled between the conduits 49 and 50.

The circuit acts in the following way: It is assumed that the temperature of the asphalt in the container is to be at least 150° C. When the temperature drops to 150° C., the thermostat 27 is activated, a current flowing from the accumulator 39 through the conduits 48, 49, and 50, the solenoid valve 29 being opened and fuel (in this case gas) being supplied to the burner 26. At the same time by means of the ignition transformer 41 the current produces an impulse to the ignition member 30 which by means of a spark ignites the fuel in the burner. When ignited the burner heats the contents of the container until the contents reaches a temperature of e.g. 180° C., when the thermostat 27 disconnects the current from the accumulator to the solenoid valve 29, thus stopping the flow of fuel so that the burner is put out.

When liquid asphalt is to be pumped to the place of application, the push button 42 is operated. The said button may be provided near the appliance 13, or it may be located elsewhere. The operation of the button 42 results in current flowing from the accumulator through the conduit 48, the coil of the relay 44 and the conduit 50, the relay 44 thus being energized. When the relay 44 is energized the contacts 44′, 44″, and 44‴ are operated. Clothing of the contact 44″ results in current flowing from the accumulator 39 through the conduit 48, the contact 44″, the motor 9 of the pump 7 and the conduit 50, the motor 9 thus starting and liquid asphalt being pumped from the container to the place of application. When the contact 44′ is closed owing to the energizing of the relay 44, current flows from the accumulator 39 through the conduit 48, the contact 44′, the coil of the relay 45 and the conduit 50, the relay 45 thus being energized and the contact 45′ being closed. At the same time the condenser 46 is charged. Closing of the contact 45′ at this time has no effect, since the contact 44‴ is already open.

When the supply of liquid asphalt to the place of application is to be stopped, the push button 42 is released, the current through the coil of the relay 44 thus being stopped. This results in the contacts 44′, 44″, and 44''' being operated. The opening of the contact 44' results in current to the motor 9 of the pump 7 being stopped, thus also the flow of liquid asphalt from the container to the place of application being stopped. Opening of the contact 44' results in current to the point of connection of the relay 45 and the condenser 46 being stopped. However, the condenser 46 and the resistance 51 are so dimensioned that their parallel connection has a time constant of such magnitude that the current through the relay 45 is maintained about 30 seconds after the relay 44 has been released. Closing of the contact 44''' owing to the release of the relay 44 results in current flowing from the accumulator through the conduit 48, the contact 44''', the contact 45', the coil of the relay 47 and the conduit 50, the relay 47 thus being activated. Thus, the contact 47' is closed and current flows again to the motor 9 of the pump 7. However, this current flows in a direction opposite to the current flowing through the motor when the relay 44 was activated, and thus the direction of rotation of the motor 9 of the pump 7 is reversed relative to their previous direction of rotation, the pump 7 thus sucking liquid asphalt back through the conduit supplying asphalt to the place of application. After the said 30 seconds the condenser 46 is discharged by means of the relay 45 and no more current flows to the said relay, the result being opening of the contact 45'. Thus, the current through the relay 47 is stopped and the relay is released, the contact 47' thus again being opened resulting in the motor 9 of the pump 7 being stopped. The apparatus is now inactive again and ready to be activated by renewed activation of the push button 42.

However, it is also possible to reactivate the apparatus before the 30 seconds have elapsed, since activation of the push button 42 within the period of 30 seconds results in the fact that the relay 44 is energized, the contacts 44', 44'', and 44''' thus being operated. Opening of the contact 44''' results in current stop to the relay 47, the contact 47' thus being opened and the oppositely directed current to the motor 9 of the pump 7 being cut off. Closing of the contact 44' results in current again flowing to the motor 9 of the pump 7 so that the motor 9 rotates in its normal direction of rotation and the pump 7 advances liquid asphalt to the place of application. Closing of the contact 44' results in re-energizing of the relay 45 and a simultaneous charging of the condenser 46.

What we claim is:

1. Apparatus for the application of thermoplastic materials, especially tar or asphalt, comprising a container for said materials, heating means for heating the materials in the container, a pumping device having a suction inlet communicating with said container, heating means for heating said pumping device, a discharge conduit passing from the outlet of the said pumping device through said container and within the container extending near the said heating means for the materials, and a reversible driving motor for said pumping device.

2. Apparatus for the application of thermoplastic materials, especially tar or asphalt, comprising a container for said materials, first heating means for heating said materials in the container, a pumping device having a suction inlet communicating with said container, second heating means independent of the said first heating means for heating said pumping device, a discharge conduit passing from the outlet of the said pumping device through said container and within the container extending near the said first heating means for the materials, and a reversible driving motor for said pumping device.

3. Apparatus for the application of thermoplastic materials, especially tar or asphalt, comprising a container for said materials, heating means for heating the materials in the container, a pumping device having a suction inlet communicating with said container, a heating jacket device surrounding said pumping device and being in heating medium transferring connection with the said heating means, a discharge conduit passing from the outlet of the said pumping device through said container and within the container extending near the said heating means for the materials, and a reversible driving motor for said pumping device.

4. Apparatus for the application of thermoplastic materials, especially tar or asphalt, comprising a container for said materials, a system of tubes for a heating medium distributed across the bottom of the container, a pumping device having a suction inlet communicating with said container, heating means for heating said pumping device, a discharge conduit passing from the outlet of the said pumping device through said container and within the container extending near at least one of the said tubes and longitudinally thereof, and a reversible driving motor for said pumping device.

5. Apparatus for the application of thermoplastic materials especially tar or asphalt, comprising a container for said materials, heating means for heating the materials in the container, a pumping device having a suction inlet communicating with said container, heating means for heating said pumping device, a discharge conduit passing from the outlet of the pumping device through said container and within the container extending near the said heating means for the materials, a reversible driving motor for said pumping device, the said container comprising an end wall detachably connected to the container body, the pumping device, the said heating means for said device, and the said heating means for said materials being attached to said end wall.

6. Apparatus for the application of thermoplastic materials, especially tar or asphalt, comprising a container for said materials, heating means for heating the materials in the container, a pumping device having a suction inlet communicating with said container, heating means for heating said pumping device, a discharge conduit passing from the outlet of the pumping device through said container and within the container extending near the said heating means for the materials, a reversible driving motor for the said pumping device, and a shunt conduit communicating with the said discharge conduit and terminating freely in the upper part of the said container.

7. Apparatus for the application of thermoplastic materials, especially tar or asphalt, comprising a container for said materials, heating means for heating the materials in the container, a pumping device having a suction inlet communicating with said container, heating means for heating said pumping device, a discharge conduit passing from the outlet of the said pumping device through said container and within the container extending near the heating means for the materials, a reversible driving motor for said pumping device, thermostatic control means for controlling the activation of the first mentioned heating means dependent on a temperature within the container, and electrical control means for activating the reverse movement of the said driving motor during a predetermined period.

References Cited

UNITED STATES PATENTS 1,694,806 12/1928 Yale.
1,759,920 5/1930 Talbott.
2,136,242 11/1938 Haupt _____ 126—343.5
3,033,249 5/1962 Tamm _____ 222—70 X

OTHER REFERENCES

German printed application of Deutsche Asphalt G.m.b.H., No. 1,116,699, Nov. 9, 1961.

ROBERT B. REEVES, *Primary Examiner.*

K. N. LEIMER, *Assistant Examiner.*